(12) United States Patent
Lu

(10) Patent No.: US 12,148,091 B2
(45) Date of Patent: Nov. 19, 2024

(54) SPECIAL EFFECT GENERATION METHOD, ELECTRONIC DEVICE AND STORAGE MEDIUM

(71) Applicant: Beijing Zitiao Network Technology Co., Ltd., Beijing (CN)

(72) Inventor: Zhixiong Lu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/398,047

(22) Filed: Dec. 27, 2023

(65) Prior Publication Data

US 2024/0127528 A1 Apr. 18, 2024

Related U.S. Application Data

(63) Continuation of application No. PCT/CN2022/108558, filed on Jul. 28, 2022.

(30) Foreign Application Priority Data

Aug. 16, 2021 (CN) .......................... 202110935926.X

(51) Int. Cl.
*G06T 15/40* (2011.01)
*G06T 5/77* (2024.01)
(Continued)

(52) U.S. Cl.
CPC ................ *G06T 15/40* (2013.01); *G06T 5/77* (2024.01); *G06T 7/11* (2017.01); *G06T 7/194* (2017.01);
(Continued)

(58) Field of Classification Search
CPC ... G06T 15/40; G06T 5/77; G06T 7/11; G06T 7/194; G06T 7/50; G06T 7/73;
(Continued)

(56) References Cited

U.S. PATENT DOCUMENTS

| 6,160,907 A * | 12/2000 | Robotham .............. G06T 13/00 715/204 |
| 2007/0285419 A1 * | 12/2007 | Givon ..................... G06T 7/251 348/46 |

(Continued)

FOREIGN PATENT DOCUMENTS

| CN | 106683161 A | 5/2017 |
| CN | 110536151 A | 12/2019 |

(Continued)

OTHER PUBLICATIONS

International Patent Application No. PCT/CN2022/108558; Int'l Search Report; dated Oct. 9, 2022; 3 pages.
(Continued)

*Primary Examiner* — Sing-Wai Wu
(74) *Attorney, Agent, or Firm* — BakerHostetler

(57) ABSTRACT

The present disclosure discloses a special effect generation method and apparatus, an electronic device, and a storage medium. The special effect generation method includes: segmenting an image to be processed to obtain multiple layers, in response to a special effect instruction; obtaining three-dimensional (3D) pose information of a special effect object, and determining an occlusion relationship between the special effect object and the multiple layers based on the 3D pose information; and rendering the special effect object or the multiple layers according to the occlusion relationship to generate a special effect image.

20 Claims, 7 Drawing Sheets

(51) Int. Cl.
  *G06T 7/11* (2017.01)
  *G06T 7/194* (2017.01)
  *G06T 7/50* (2017.01)
  *G06T 7/73* (2017.01)
  *G06T 19/20* (2011.01)
  *G06V 20/60* (2022.01)
  *H04N 5/272* (2006.01)

(52) U.S. Cl.
  CPC ............... *G06T 7/50* (2017.01); *G06T 7/73* (2017.01); *G06T 19/20* (2013.01); *H04N 5/272* (2013.01); *G06T 2219/2016* (2013.01); *G06V 20/60* (2022.01)

(58) Field of Classification Search
  CPC . G06T 19/20; G06T 2219/2016; H04N 5/272; G06V 20/60
  See application file for complete search history.

(56) References Cited

U.S. PATENT DOCUMENTS

2021/0125664 A1* 4/2021 Holland ................ G06T 19/006
2021/0158021 A1   5/2021 Wu et al.
2023/0014448 A1* 1/2023 Gonzalez Morin .. G06V 10/764

FOREIGN PATENT DOCUMENTS

| CN | 110738737 A | 1/2020 |
| CN | 110929651 A | 3/2020 |
| CN | 111833458 A | 10/2020 |
| CN | 112184856 A | 1/2021 |
| WO | WO 2021/068799 A1 | 4/2021 |
| WO | WO 2021/115623 A1 | 6/2021 |

OTHER PUBLICATIONS

European Patent Application No. 22857552.8; Extended Search Report; dated Jul. 25, 2024; 13 pages.
Chai et al.; "Dynamic Hair Manipulation In Images and Videos"; ACM Transactions on Graphics; vol. 32 No. 4; Jul. 2013; 8 pages.
Bacher et al.; "An Advert Creation System for 3D Product Placements"; ECML PKDD; arXiv:2006.15131; Jun. 2020; 16 pages.
Balakrishnan et al.; "Synthesizing Images of Humans in Unseen Poses"; IEEE Conf. on Computer Vision and Pattern Recognition; 2018; p. 8340-8348.
"Spark AR Studio—Layers, Segmentation and Emitters"; https://youtube.com/watch?v=TnWrJoPCfco; YouTube; Jul. 2019; accessed Jul. 12, 2024; 2 pages.

* cited by examiner

SPECIAL EFFECT GENERATION METHOD, ELECTRONIC DEVICE AND STORAGE MEDIUM

CROSS-REFERENCE TO RELATED APPLICATIONS

This is a continuation of International Patent Application No. PCT/CN2022/108558, filed on Jul. 28, 2022, which claims priority to Chinese Patent Application No. 202110935926.X, filed on Aug. 16, 2021, the disclosures of which are incorporated herein by reference in their entireties.

TECHNICAL FIELD

This disclosure relates to the technical field of image processing technology, particularly to a special effect generation method and apparatus, an electronic device, and a storage medium.

BACKGROUND

With the development of technology, more and more applications (Apps) have entered our daily lives. Some Apps can support special effects for local beautification of an image, such as support a special effect for beautify a sky area in an image into a sky in a cartoon, which is very popular with users.

In related technologies, when an App performs local beautification of an image, it usually first segments a local area from the image and then simply overlays special effect data onto the local area.

SUMMARY

This disclosure provides a special effect generation method and apparatus, an electronic device, and a storage medium.

According to some embodiments, the present disclosure provides a special effect generation method, comprising:
  segmenting an image to be processed to obtain multiple layers, in response to a special effect instruction;
  obtaining three-dimensional (3D) pose information of a special effect object, and determining an occlusion relationship between the special effect object and the multiple layers based on the 3D pose information; and
  rendering the special effect object or the multiple layers according to the occlusion relationship to generate a special effect image.

According to other embodiments, the present disclosure further provides a special effect generation apparatus, comprising:
  a segmentation module configured to segment an image to be processed to obtain multiple layers, in response to a special effect instruction;
  an occlusion relationship determination module configured to obtain three-dimensional (3D) pose information of a special effect object, and determine an occlusion relationship between the special effect object and the multiple layers based on the 3D pose information;
  a rendering module configured to render the special effect object or the multiple layers according to the occlusion relationship to generate a special effect image.

According to still other embodiments, the present disclosure further provides an electronic device, comprising:
  at least one processor;
  a storage device for storing at least one program that, when executed by at least one processor, causes the at least one processor to implement the special effect generation method according to any embodiment of the present disclosure.

According to still other embodiments, the present disclosure further provides a non-transitory computer-readable storage medium containing computer executable instructions that, when executed by a processor, causes the processor to execute the special effect generation method according to any embodiment of the present disclosure.

DETAILED DESCRIPTION

Figure 1:
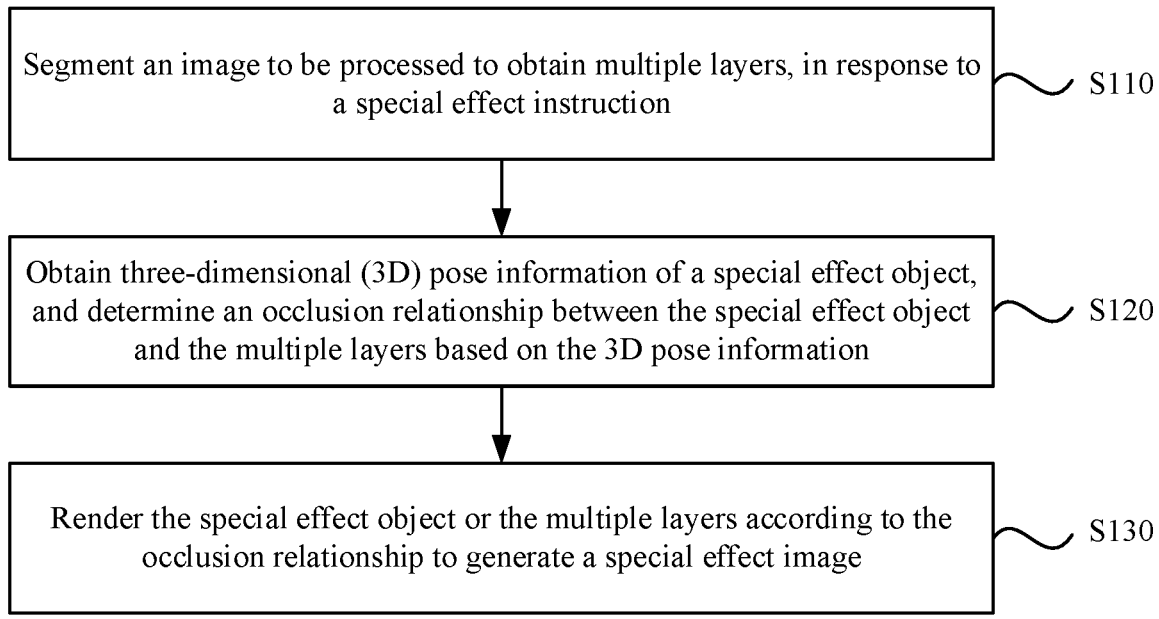
FIG. 1 is a flowchart of a special effect generation method provided in an embodiment of the present disclosure.

Below, embodiments of this disclosure will be described with reference to the drawings. Although some embodiments of the present disclosure are shown in the drawings, it should be understood that the present disclosure can be implemented in various forms, and these embodiments are provided for the purpose of understanding the present disclosure. The accompanying drawings and embodiments disclosed herein are for illustrative purposes only.

It should be understood that the various steps described in the methods of the embodiments of the present disclosure may be executed in a different order, and/or executed in parallel. In addition, the methods may comprise additional steps and/or some of the illustrated steps may be omitted. The scope of this disclosure is not limited in this regard.

The term "comprising" and its variants as used herein is an open-ended mode expression, that is, "comprising but not limited to". The term "based on" means "based at least in part on". The term "one embodiment" means "at least one embodiment"; the term "another embodiment" means "at least one additional embodiment"; The term "some embodiments" means "at least some embodiments". Related definitions of other terms will be given in the following description.

It should be noted that the concepts of "first" and "second" mentioned in the present disclosure are only used to distinguish different devices, modules or units, and are not used to limit the order of functions performed by these devices, modules or units, or interdependence therebetween.

It should be noted that the modifications of "a" and "a plurality of" mentioned in the present disclosure are illustrative and not restrictive, and those skilled in the art should understand that unless clearly indicated in the context, they should be understood as "one or more".

The inventor has found that the special effects provided in the APPs in the related technologies are relatively monotonous and cannot meet the needs of the users.

FIG. 1 is a flowchart of a special effect generation method provided in an embodiment of the present disclosure. The embodiment is applicable to generating an image special effect, for example, to a situation where an image is rendered based on an occlusion relationship between a determined special effect object and some layers to obtain a special effect of presenting the special effect object as a giant object. The method can be performed by a special effect generation apparatus that can be integrated into an image enhancement App and installed together with the App in an electronic device, such as a mobile phones, a computer, etc.

As shown in FIG. 1, the special effect generation method provided in this embodiment comprises the following steps.

In S110, an image to be processed is segmented to obtain multiple layers, in response to a special effect instruction.

In some embodiments, an APP having a special effect generation apparatus integrated can start running in response to a launch operation (such as a click operation on an APP icon) after being installed on an electronic device. After the APP is launched, the image to be processed, which may be a static image or a dynamic image, is selected from a storage of the electronic device in response to a trigger operation on an image selection control in an interface. In addition, the APP can also capture an image in real time using a camera equipped by the electronic device in response to a trigger operation on an image acquisition control in the interface, and can use the image captured in real time as the image to be processed.

The APP can present the image to be processed in an editing area of the interface, and the interface further comprises a selection control of a special effect object. When the selection control is triggered, the special effect instruction can be generated. Accordingly, the APP can segment the image to be processed in response to the special effect instruction.

The image to be processed can be segmented based on traditional segmentation methods (such as a pixel region growth algorithm, an edge segmentation algorithm, etc.); it is also possible to segment the image to be processed based on a supervised learning segmentation model (such as a fully convolutional network model, a U-net model, etc.).

Segmented regions that represents a same semantics or a same individual can be used as a layer, allowing more layers to be segmented, thus increasing a variety and flexibility of special effects. For example, if regions that represents a same semantics are taken as a layer, regions representing the sky can be considered as a layer, and regions representing buildings can be used as another layer. If regions that represents a same individual as a layer, regions representing building 1 can be considered as a layer, and regions representing building 2 can be used as another layer.

In S120, three-dimensional (3D) pose information of a special effect object is obtained, and an occlusion relationship between the special effect object and the multiple layers is determined based on the 3D pose information.

In some embodiments, the special effect object can be a virtual object generated by constructing a 3D model. For each type of virtual object, a selection control of a special effect corresponding to the type of virtual object can be set in the interface, and different virtual objects can be obtained as the special effect object by triggering different selection controls.

The special effect object can also be a real object corresponding to a layer in the image to be processed. It can be considered that the multiple layers obtained through segmentation comprise a real object layer. Correspondingly, before obtaining the 3D pose information of the special effect object, the method can further comprise: determining a real object in the real object layer as the special effect object. For example, for a real object, there can be a selection control to select a special effect object from the layer. By triggering the selection control of the layer, the real object layer can be selected, and the real object identified from the layer can be used as the special effect object.

The 3D pose information can comprise information such as the 3D positions and rotation angles of multiple feature points on the special effect object. The feature points can be points such as corner points and/or joint points, which can represent shape features of the special effect object. If the special effect object is a virtual object, the 3D pose information corresponding to the virtual object can be directly obtained from a storage of the electronic device or a backend server of the APP; if the special effect object is a real object, the 3D pose information can be determined based on estimated image depth values.

The determining the occlusion relationship between the special effect object and the multiple layers based on the 3D pose information comprises: determining an occluded area of the special effect object, a layer that occludes the occluded area and an area that is not occluded by the layers of the special effect object, based on a supervised learning occlusion relationship determination model, according to the 3D pose information of the multiple feature points of the special effect object. The occluded area and the area that is not occluded can be determined based on the multiple feature points. Thereby, the occlusion relationship between the special effect object and the multiple layers can be obtained.

In some embodiments, the determining the occlusion relationship between the special effect object and the multiple layers based on the 3D pose information comprises: determining an overlapping relationship of the multiple layers based on depth information of each of the multiple layers; and determining the occlusion relationship between the special effect object and the multiple layers according to the 3D pose information of multiple feature points of the special effect object and the overlapping relationship of the multiple layers.

In these embodiments, after segmenting the image to be processed to obtain the multiple layers, a distance between the camera and an object in the scene can also be estimated based on an image depth algorithm to obtain depth information for each of the multiple layers; moreover, the overlapping relationship between the multiple layers can be determined based on the depth information of the each of the multiple layers. Correspondingly, the occlusion relationship between the special effect object and the multiple layers can be determined based on a supervised learning occlusion relationship determination model, according to the 3D pose information of the multiple feature points of the special effect object and the overlapping relationship between the multiple layers.

For example, assuming that the depth of Region 1 of the special effect object is less than that of Region 2, and Layer 1 is overlaid on Layer 2, the occlusion relationship can comprise: Region 1 of the special effect object occludes Layer 1, and Region 2 is occluded by Layer 1 but not by Layer 2.

In S130, the special effect object or the multiple layers are rendered according to the occlusion relationship to generate a special effect image.

The rendering the special effect object or the multiple layers according to the occlusion relationship may comprise: if the special effect object is a virtual object, rendering a part of the special effect object that is not occluded by the multiple layers; if the special effect object is a real object, rendering a region of a layer that is previously occluded by the special effect object, but is not occluded by the special effect object in the occlusion relationship.

By rendering the special effect object or the multiple layers based on the occlusion relationship between the special effect object and the multiple layers, a new perspective relationship between the special effect object and the multiple layers can be presented, which can visually change a size of the special effect object and achieve a more diversified special effect presentation to meet users' needs.

In some embodiments, it is possible to determine at least one pattern of the occlusion relationship between the special effect object and the multiple layers. For example, in Pattern 1 of the occlusion relationship, Layer 1 is occluded by Region 1 of the special effect object; in Pattern 2 of the occlusion relationship, Region 1 of the special effect object is occluded by Layer 1. Correspondingly, when rendering the special effect object or the multiple layers based on the occlusion relationship, rendering can be performed with different patterns of the occlusion relationship in response to a switch instruction to generate special effect images with different effects, thereby improving a variety and flexibility of special effects and achieving more diverse special effects. On this basis, users can save satisfied special effect images that meet their needs to a certain extent.

In some cases, in order to make a change in size of the special effect object more intense in terms of visual sense, the rendering the special effect object based on the occlusion relationship between the special effect object and the multiple layers may further comprise: rendering the special effect object with a change in size of the special effect object. After determining the 3D positions of the multiple feature points of the special effect object, a size of the special effect object can be changed by synchronously adjusting a distance relationship between the 3D positions of the multiple feature points. For example, by increasing a distance between the 3D positions of every two feature points, the size of the special effect object can be increased; by decreasing the distance between the 3D positions of every two feature points, the size of the special effect object can be decreased. When users expect the special effect object in the special effect image to appear as a giant object or a reduced object, an enlarged or reduced special effect object is rendered, improving a visual effect and users' experience.

In some embodiments, the multiple layers comprise a foreground layer, a background layer, and a plane layer; and the occlusion relationship comprises an occlusion relationship between the foreground layer and the special effect object.

In these embodiments, there may be three layers, and the special effect object can be always overlaid on the background layer. If the special effect object is a virtual object, the virtual object can be fitted to the plane layer to create an effect of a virtual object placed or standing on the plane layer.

Figure 2:
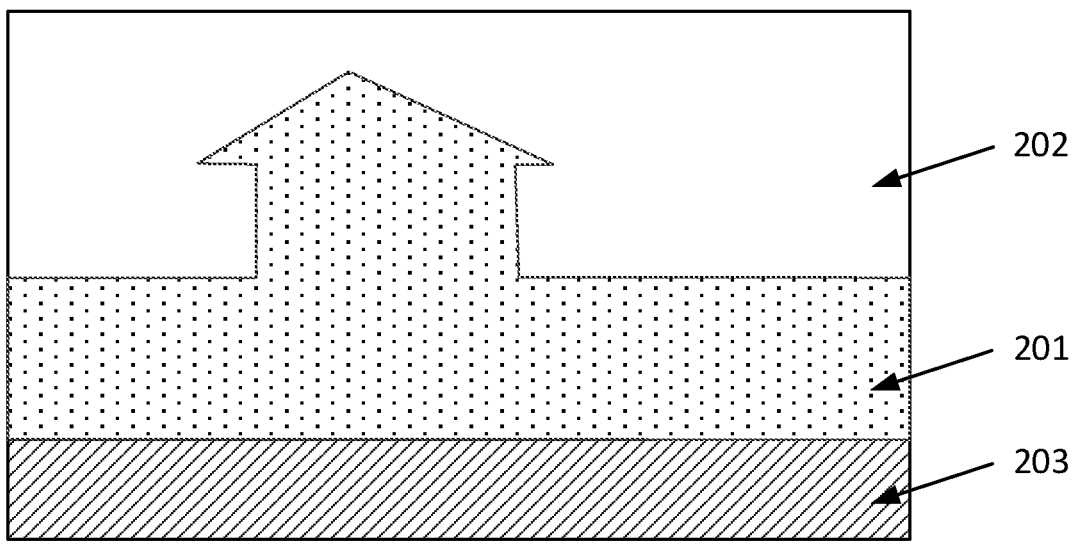
FIG. 2 is a schematic diagram of layers segmented in the special effect generation method provided in an embodiment of the present disclosure.

As an illustration, FIG. 2 is a schematic diagram of layers segmented in the special effect generation method provided in an embodiment of the present disclosure. As shown in FIG. 2, the layers can comprise a building layer 201, a sky layer 202, and a ground layer 203. The building layer 201 is overlaid on the sky layer 202, and can be used as the foreground layer. The sky layer 202 is the background layer, and the ground layer 203 is the plane layer. The ground layer 203 can be used to place a virtual object.

When determining the occlusion relationship between the special effect object and multiple layers, it is possible to determine an occlusion relationship between the special effect object and the foreground layer only based on the 3D pose information of multiple local regions composed of feature points of the special effect object. By rendering the special effect object or the multiple layers based on the occlusion relationship between the special effect object and the foreground layer, a new perspective relationship between the special effect object and the foreground layer can be presented, which can visually change the size of the special effect object, increase a speed of special effect rendering, and improve the users' experience.

In the technical solution of the embodiments, in response to the special effect instruction, the image to be processed is segmented to obtain the multiple layers; the 3D pose information of the special effect object is obtained, and the occlusion relationship between the special effect object and the multiple layers is determined based on the 3D pose information; according to the occlusion relationship, the special effect object or the multiple layers are rendered to generate the special effect image. By rendering the special effect object or the multiple layers based on the occlusion relationship between the multiple layers and the special effect object, more diverse special effects can be achieved to meet users' needs.

This embodiment can be combined with the schemes of the special effect generation method provided in the above embodiments. The special effect generation method provided in this embodiment comprises: in a scenario of capturing an image in real time, in response to a preset trigger, a layered rendering based on the occlusion relationship is switched to terminate the layered rendering and display only an original image. It is possible to change a perspective relationship of an image based on a preset trigger in a video capturing scenario, that is, to achieve imperceptible switching between an image obtained by layered rendering layers with a special effect added and an original non-layered image in which no special effects are added, thereby enhancing a presentation effect of the video special effect and improving the users' experience.

Figure 3:
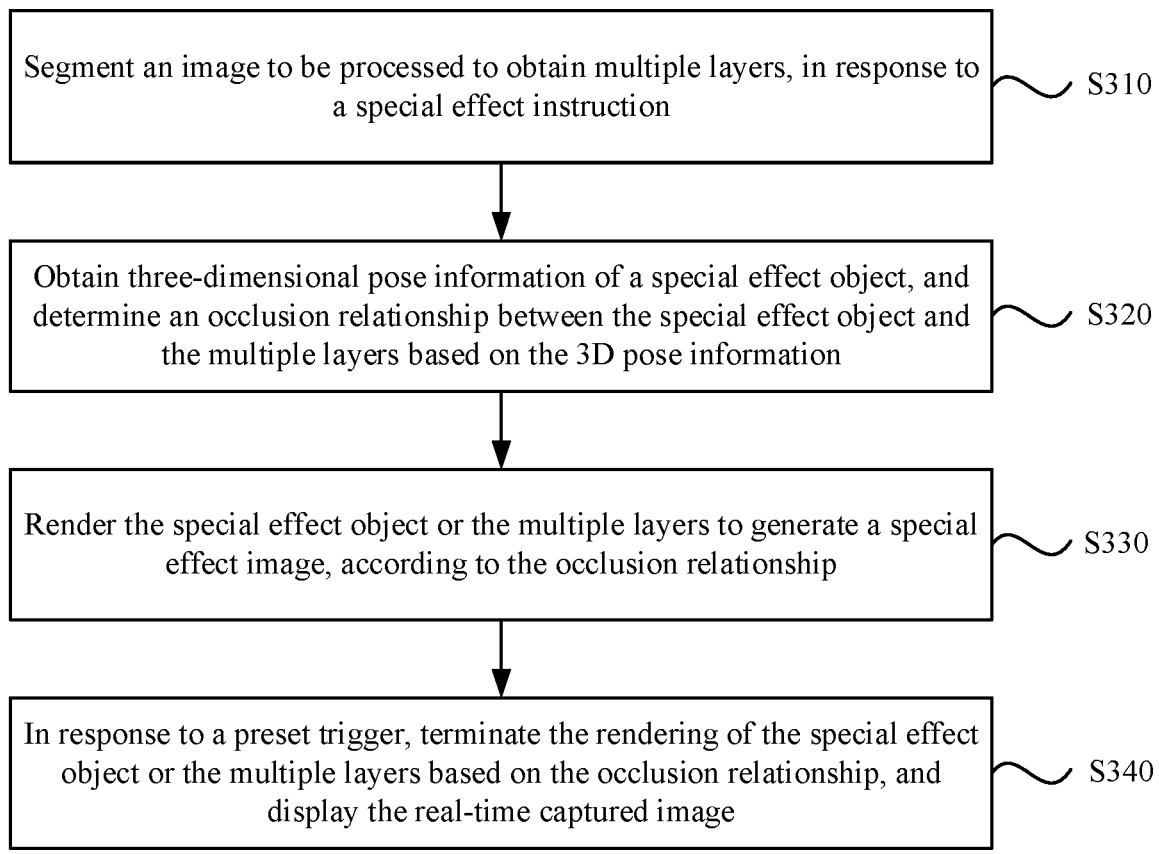
FIG. 3 is a flowchart of a special effect generation method provided in an embodiment of the present disclosure.

FIG. 3 is a flowchart of a special effect generation method provided in an embodiment of the present disclosure. As shown in FIG. 3, if the image to be processed is a real-time captured image, the special effect generation method provided in this embodiment comprises the following steps.

In S310, an image to be processed is segmented to obtain multiple layers, in response to a special effect instruction.

In S320, 3D pose information of a special effect object is obtained, and an occlusion relationship between the special effect object and the multiple layers is determined according to the 3D pose information.

In S330, the special effect object or the multiple layers are rendered to generate a special effect image, according to the occlusion relationship.

In S340, in response to a preset trigger, the rendering of the special effect object or the multiple layers based on the occlusion relationship is terminated, and the real-time captured image is displayed.

In some embodiments, if the image to be processed is the real-time captured image and the special effect object is a virtual object, a presentation of the virtual object is switched by a preset trigger from appearing as a giant object by layered rendering to disappearing on the screen, thereby enhancing a special effect presentation effect in the video and improving the users' experience.

If the image to be processed is a real-time captured image and the special effect object is a real object, a presentation of the real object is switched by a preset trigger from appearing as a giant object by layered rendering to appearing as its original size. This achieves a visual effect of continuously changing a size of the special effect object from large to small, which can enhance a presentation effect of the special effect and improve the users' experience.

In some embodiments, the preset trigger comprises at least one of: a preset input operation, a trigger of a countdown timer, and an identification of a predefined action of the special effect object.

The preset operation can be a trigger operation input through a screen, a keyboard, or a mouse of an electronic device. Correspondingly, layered rendering and non-layered rendering can be switched in response to the trigger operation. A countdown timer can be set in response to a special effect instruction. Correspondingly, when the countdown timer is down to zero, it can trigger a switch between layered rendering and non-layered rendering. The predefined action can be an action such as the special effect object jumping to a certain height, an occluded limb lifting to a certain height, etc. Correspondingly, switching between layered rendering and non-layered rendering can be triggered when it is recognized that the action of the special effect object conforms to the predefined action. In addition, the preset trigger can also comprise other trigger events, such as a detection that a local region of a real object that is occluded advances a certain distance, which are not exhaustively listed here.

Figure 4:
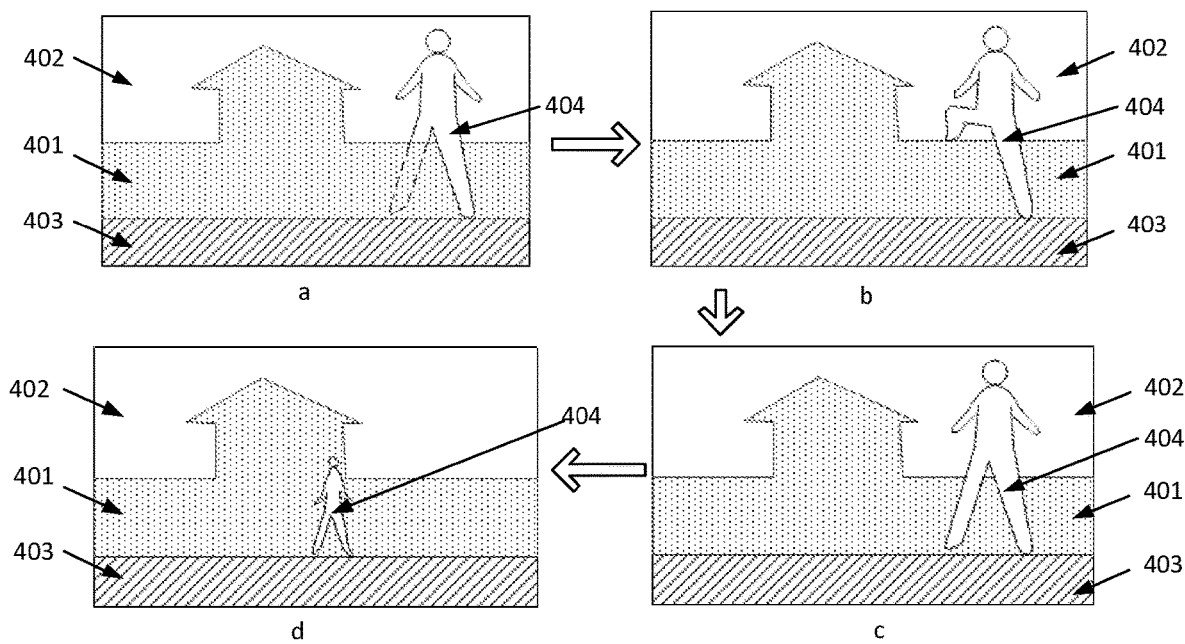
FIG. 4 is a schematic diagram of a preset trigger in the special effect generation method provided in an embodiment of the present disclosure.

As an illustration, FIG. 4 is a schematic diagram of a preset trigger in the special effect generation method provided in an embodiment of the present disclosure. As shown in FIG. 4, the layers can comprise a building layer 401, a sky layer 402, a ground layer 403, and a character layer 404. A person corresponding to character layer 404, who is closest to the camera, can be identified as a special effect object. FIG. 4 comprises four images: a, b, c, and d. The preset trigger may be a leg lift action of the person detected in image b. Correspondingly, when the person's leg lift action is detected, a perspective relationship of the image can be switched, that is, from an effect that a leg of a giant is occluded by a building in image a to an effect that the giant's legs are not occluded by the building in the original non-layered image c, in order to present an effect of the giant crossing the building in sequence in images a, b, and c.

After switching from an giant effect to a normal human effect, the person can move away from the camera in image d to create an effect that the person is a normal human through a perspective relationship of the image. This enables a continuous transformation of a person from a giant to a normal person in a recorded video scenario, thus enhancing a presentation effect of the special effect and improving the users' experience.

In some embodiments, the person in image a can also be scaled up for rendering, and the person in image c and/or image d can be scaled down for rendering, which can make the change in size of the person's visual appearance more intense, thereby enhancing the presentation effect of the special effect.

In the technical solution of the embodiments, in the scenario of capturing an image in real time, in response to the preset trigger, the layered rendering based on the occlusion relationship is switched to terminate the layered rendering and display only an original image. It is possible to change a perspective relationship of an image based on a preset trigger in a video capturing scenario, that is, to achieve imperceptible switching between an image obtained by layered rendering layers with a special effect added and an original non-layered image in which no special effects are added, thereby enhancing a presentation effect of the video special effect and improving the users' experience.

The special effect generation method provided by the embodiments of the present disclosure and the special effect generation method provided by the above embodiments belong to a same inventive concept. For the technical details not described in detail in the embodiments, reference can be made to the above embodiments, and the embodiments can achieve a same beneficial effect as the above embodiment.

This embodiment can be combined with the schemes of the special effect generation method provided in the above embodiments. In the special effect generation method provided in this embodiment, a step of layered rendering that is performed when the special effect object is a virtual object will be described. By fitting the virtual object to a plane layer, an effect of the virtual object placed/standing on a plane surface can be presented. By rendering regions of the virtual object that occlude other layers, it is possible to achieve an occlusion interaction effect that some parts of the virtual object are in front of layers and some parts are behind the layers.

Figure 5:
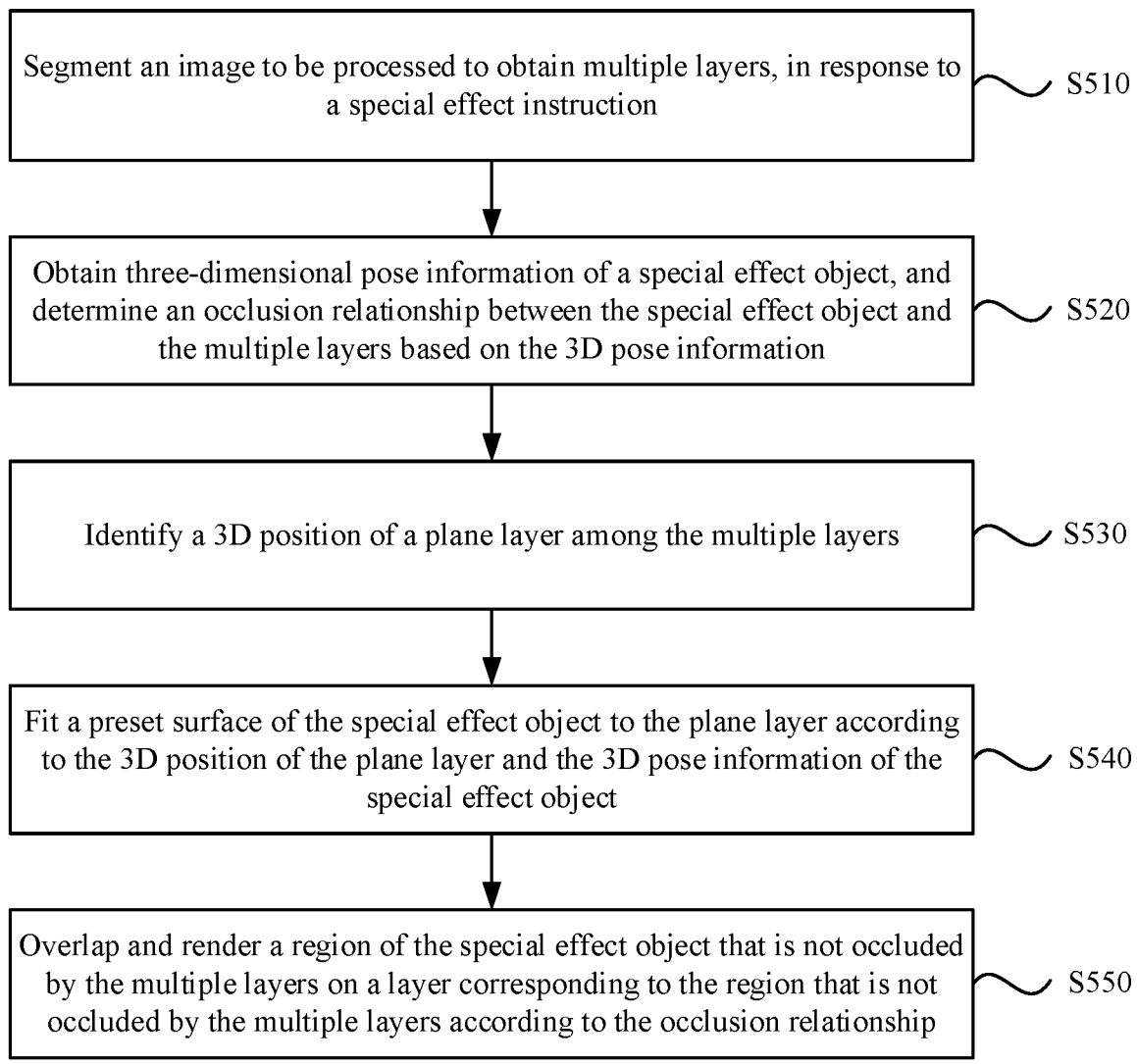
FIG. 5 is a flowchart of a special effect generation method provided in an embodiment of the present disclosure.

FIG. 5 is a flowchart of a special effect generation method provided in an embodiment of the present disclosure. As shown in FIG. 5, if the special effect object is a virtual object, the special effect generation method provided in this embodiment comprises the following steps.

In S510, an image to be processed is segmented to obtain multiple layers, in response to a special effect instruction.

In S520, 3D pose information of a special effect object is obtained, and an occlusion relationship between the special effect object and the multiple layers is determined according to the 3D pose information.

In S530, a 3D position of a plane layer among the multiple layers is identified.

In this embodiment, the 3D position of the plane can be constructed using the Simultaneous Localization and Mapping (SLAM) method. The 3D position of the plane can also be identified based on multiple parallax images using the Multi-view Stereo Net (MVS Net) method. In addition, other image geometry estimation algorithms that can be used to identify the 3D position of the plane layer can also be applied here, which will not be exhaustively listed here. By identifying the 3D position of the plane layer, a rendering effect of a virtual object placed/standing on the plane layer can be achieved, making a special effect rendering more realistic and natural.

In S540, a preset surface of the special effect object is fitted to the plane layer according to the 3D position of the plane layer and the 3D pose information of the special effect object.

In some embodiments, the preset surface can be a bottom surface of the special effect object (such as feet of an animal/person object). After the 3D position of the plane layer is determined, the 3D pose information of the preset surface of the special effect object can be aligned with the 3D position of the plane, resulting in a more natural fit between the special effect object and the plane layer.

In S550, a region of the special effect object that is not occluded by the multiple layers is superimposed and rendered on a layer corresponding to the region that is not occluded by the multiple layers according to the occlusion relationship.

In some embodiments, it is possible to determine different regions of the special effect object that occlude the layers, and overlay and render the regions on the layers corresponding to the regions. For those regions of the special effect object that are occluded by the layers, no rendering process is processed. This enables occlusion interaction with the layers, such that some regions of the virtual object are in front of the layers and some regions are behind the layers. Moreover, during the rendering process of the virtual object, a size of the virtual object can be changed based on sizes of objects in other layers of the image, and the resized special effect object can be rendered to make a rendering effect more harmonious.

Figure 6:
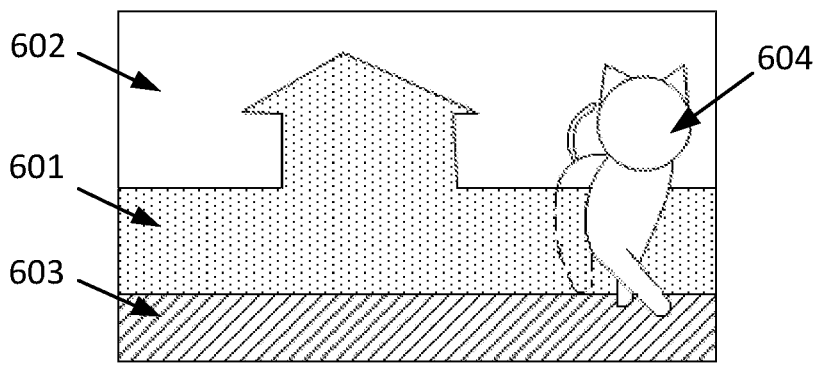
FIG. 6 is a schematic diagram of an occlusion relationship in the special effect generation method provided in an embodiment of the present disclosure.
Figure 7:
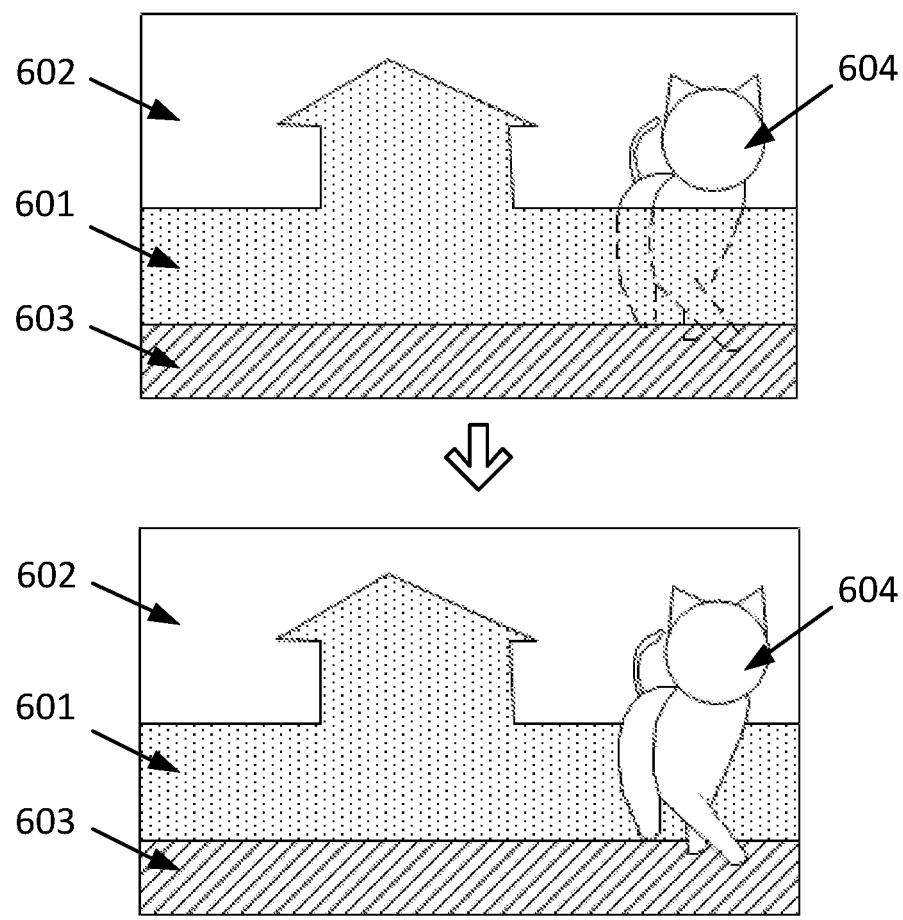
FIG. 7 is a schematic diagram of another occlusion relationship in the special effect generation method provided in an embodiment of the present disclosure.

The determined occlusion relationship can comprise at least one pattern. FIG. 6 is a schematic diagram of an occlusion relationship in the special effect generation method provided in an embodiment of the present disclosure. FIG. 7 is a schematic diagram of another occlusion relationship in the special effect generation method provided in an embodiment of the present disclosure.

As shown in FIGS. 6 and 7, the layers can comprise a building layer 601, a sky layer 602, and a ground layer 603. Wherein, the building layer 601 is a foreground layer, and the sky layer 602 is a background layer. The ground layer 603 can be used to place a virtual objects 604, such as a 3D cat model constructed in FIGS. 6 and 7.

The occlusion relationship between the cat model and the foreground layer in FIG. 6 can comprise: an occlusion relationship that the front limbs of the cat model occlude the foreground layer, and the hind limbs are occluded by the foreground layer. By rendering the cat model based on the occlusion relationship, a visual effect of a giant cat crossing a building can be presented.

The cat model in FIG. 7 may be a dynamic model, and the occlusion relationship between the cat model and the foreground layer can comprise: an occlusion relationship that all limbs of the cat model are originally occluded by the foreground layer; and an occlusion relationship that after recognizing a jump of the cat model, all limbs of the cat model can occlude the foreground. By rendering the cat model based on these two occlusion relationships, a visual effect of a giant cat jumping from the back of a building to the front can be presented.

In the technical solution of the embodiments, a step of layered rendering that is performed when the special effect object is a virtual object is described. By fitting the virtual object to the plane layer, the effect of the virtual object placed/standing on the plane layer can be presented. By rendering the regions of the virtual object that occlude the layers, it is possible to achieve an occlusion interaction with the layers, such that some regions of the virtual object are in front of the layers and some regions are behind the layers. The special effect generation method provided by the embodiments of the present disclosure and the special effect generation method provided by the above embodiments belong to a same inventive concept. For the technical details not described in detail in the embodiments, reference can be made to the above embodiments, and the embodiments can achieve a same beneficial effect as the above embodiment.

This embodiment can be combined with the schemes of the special effect generation method provided in the above embodiments. In the special effect generation method provided in this embodiment, a step of layered rendering that is performed when the special effect object is a real object will be described. By inpainting a region previously occluded by the special effect object in the layers and not occluded by the special effect object in the occlusion relationship, an original perspective relationship of the real object can be changed, resulting in a new occlusion interaction between the real object and the layers, and achieving a visual change in size of the real object.

Figure 8:
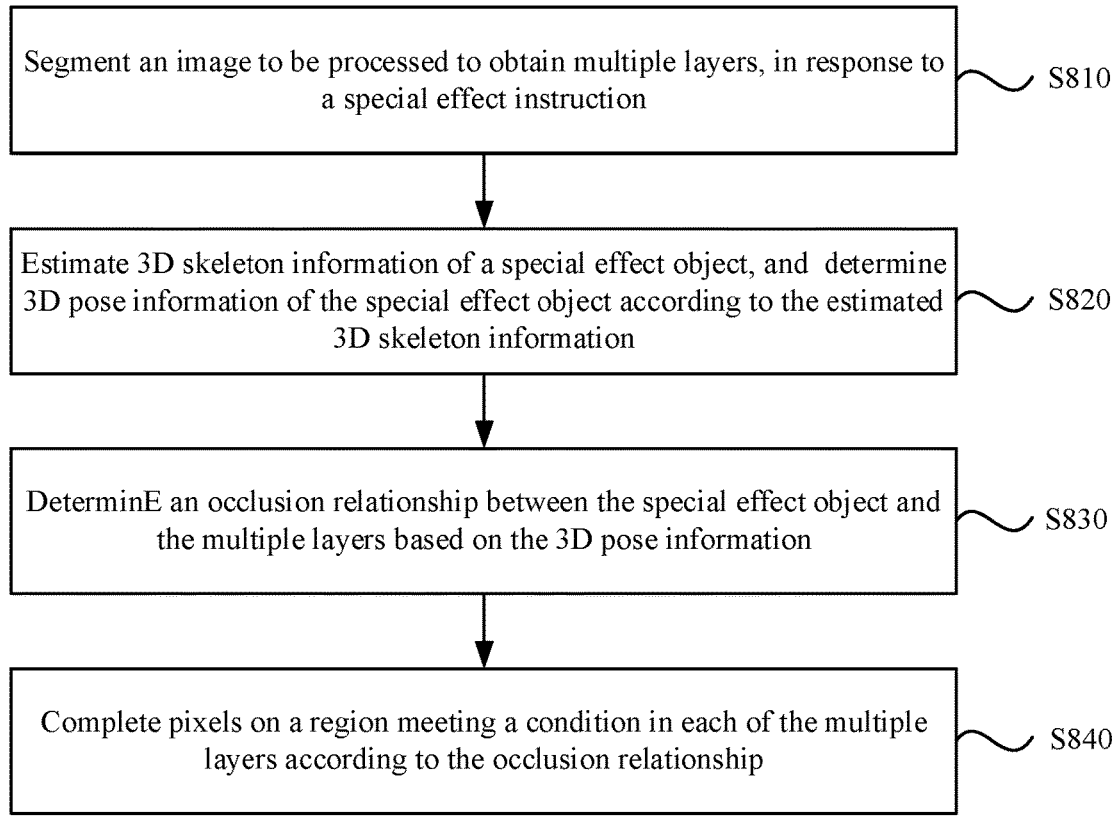
FIG. 8 is a flowchart of a special effect generation method provided in an embodiment of the present disclosure.

FIG. 8 is a flowchart of a special effect generation method provided in an embodiment of the present disclosure. As shown in FIG. 8, if the special effect object is a real object in the image to be processed, the special effect generation method provided in this embodiment comprises the following steps.

In S810, an image to be processed is segmented to obtain multiple layers, in response to a special effect instruction.

In S820, 3D skeleton information of a special effect object is estimated, and 3D pose information of the special effect object is determined according to the estimated 3D skeleton information.

A real object corresponding to a layer closer to a camera position can be selected as the special effect object, so that in response to a preset trigger, a more intense visual effect of the special effect object changing from large to small can be presented. After determining the special effect object, the 3D skeleton information of the special effect object can be estimated by computer vision estimation, which can be used as the 3D pose information of the special effect object to determine an anteroposterior relationship of multiple parts of the special effect object.

In S830, an occlusion relationship between the special effect object and the multiple layers is determined based on the 3D pose information.

In S840, a region meeting a condition in each of the multiple layers is inpainted according to the occlusion relationship.

In some embodiments, the region meeting the condition comprises a region occluded by the special effect object in the image to be processed, and occluding the special effect object in the occlusion relationship. For example, referring to image a in FIG. 4, a dashed part in the image can be considered as a region in a layer previously occluded by the special effect object, but occluding the special effect object in the occlusion relationship.

By inpainting the region in each of the multiple layers previously occluded by the special effect object and occluding the special effect object in the occlusion relationship, the original perspective relationship of the real object can be changed, resulting in a rendering effect that parts of the real object are in front of the layers and parts behind the layers, and changing a size of the real object in a visual sense.

In some embodiments, if the image to be processed is a real-time captured image, the inpainting the region meeting the condition in each of the multiple layers comprises: in response to the real-time captured image being captured with a fixed camera position, inpainting the region meeting the condition in each of the multiple layers based on pixels in a region corresponding to the region meeting the condition in the each of the multiple layers in a previous frame image; in response to the real-time captured image being captured with a moving camera position, inpainting the region meeting the condition in each of the multiple layers by a preset image inpainting algorithm.

A fixed camera position can be understood as capturing images by a stationary camera, whereas a moving camera position can be understood as capturing images by a movable camera.

The previous frame image can be considered as at least one historically captured image. In a case where the real-time captured image is captured with a fixed camera position, an image frame in which a region corresponding to the region meeting the condition in the each of the multiple layers is not occluded can be determined from the previous frame image, and the region in the image to be processed is inpainted based on pixels of the region in the image frame determined from the previous frame image.

In a case where the real-time captured image is captured with a moving camera position, the region meeting the condition in the layers changes. Pixels in the region can be calculated using a preset image inpainting algorithm (such as the in painting algorithm) based on pixels adjacent to the region in the image to be processed, so as to inpaint the region in the image to be processed. In addition, if the real-time captured image is an image read from a storage, the region can also be inpainted using a preset image inpainting algorithm.

These embodiments provide some methods for inpainting the region meeting the condition. Other methods are also applicable and are not exhaustively listed here.

In the technical solution of the embodiments, a step of layered rendering that is performed when the special effect object is a real object is described. By inpainting the region previously occluded by the special effect object in each of the layers and not occluded by the special effect object in the occlusion relationship, an original perspective relationship of the real object can be changed, resulting in a new occlusion interaction between the real object and the layers, and achieving a visual change in size of the real object. The special effect generation method provided by the embodiments of the present disclosure and the special effect generation method provided by the above embodiments belong to a same inventive concept. For the technical details not described in detail in the embodiments, reference can be made to the above embodiments, and the embodiments can achieve the same beneficial effect as the above embodiments.

Figure 9:
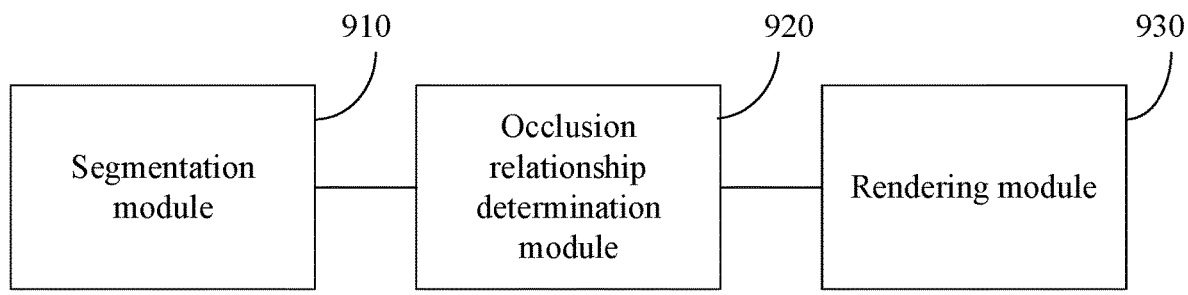
FIG. 9 is a schematic structural diagram of a special effect generation apparatus provided in an embodiment of the present disclosure.

FIG. 9 is a schematic structural diagram of a special effect generation apparatus provided in an embodiment of the present disclosure. The special effect generation apparatus provided in this embodiment is applicable to generating a special effect image, for example, to a situation where an image is rendered based on an occlusion relationship between a special effect object and layers to obtain a special effect of presenting the special effect object as a giant object.

As shown in FIG. 9, the special effect generation apparatus provided in this embodiment comprises:
a segmentation module 910 configured to segment an image to be processed to obtain multiple layers, in response to a special effect instruction; an occlusion relationship determination module 920 configured to obtain three-dimensional (3D) pose information of a special effect object, and determine an occlusion relationship between the special effect object and the multiple layers based on the 3D pose information; and a rendering module 930 configured to render the special effect object or the multiple layers according to the occlusion relationship to generate a special effect image.

In some embodiment, in response to the image to be processed being a real-time captured image, the special effect generation apparatus further comprises:
a special effect termination module configured to after generating the special effect image, in response to a preset trigger, terminate the rendering of the special effect object or the multiple layers according to the occlusion relationship, and display the real-time captured image, wherein the preset trigger comprises at least one of: a preset input operation, a trigger of a countdown timer, and an identification of a predefined action of the special effect object.

In some embodiments, the occlusion relationship determination module 920 may be further configured to:
determine an overlapping relationship of the multiple layers based on depth information of each of the multiple layers; and determine the occlusion relationship between the special effect object and the multiple layers according to the 3D pose information of multiple feature points of the special effect object and the overlapping relationship of the multiple layers.

In some embodiments, in response to the special effect object being a virtual object, the rendering module 930 may be configured to:
identify a 3D position of a plane layer among the multiple layers; fit a preset surface of the special effect object to the plane layer according to the 3D position of the plane layer and the 3D pose information of the special effect object; and superimpose and render a region of the special effect object that is not occluded by the multiple layers on a layer corresponding to the region.

In some embodiments, the multiple layers obtained through segmentation comprise a real object layer, correspondingly, the segmentation module 910 may be further configured to: before the obtaining the 3D pose information of the special effect object, determine a real object in the real object layer as the special effect object.

In some embodiments, in response to the special effect object being a real object in the image to be processed, the occlusion relationship determination module 920 may be configured to:
estimate 3D skeleton information of the special effect object, and determine the 3D pose information of the special effect object according to the estimated 3D skeleton information.

In some embodiments, in response to the special effect object being a real object in the image to be processed, the rendering module 930 may be configured to:
inpaint a region meeting a condition in each of the multiple layers, wherein the region meeting the condition comprises a region occluded by the special effect object in the image to be processed, and occluding the special effect object in the occlusion relationship.

In some embodiments, in response to the image to be processed being a real-time captured image, the rendering module 930 may be configured to:
in response to the real-time captured image being captured with a fixed camera position, inpaint the region meeting the condition in each of the multiple layers based on pixels in a region corresponding to the region meeting the condition in the each of the multiple layers in a previous frame image; and in response to the real-time captured image being captured with a moving camera position, inpaint the region meeting the condition in each of the multiple layers by a preset image inpainting algorithm.

In some embodiments, the rendering module 930 may be further configured to: render the special effect object with a change in size of the special effect object.

In some embodiments, the multiple layers comprise a foreground layer, a background layer, and a plane layer, and the occlusion relationship comprises an occlusion relationship between the foreground layer and the special effect object.

The special effect generation apparatus provided in this embodiment can execute the special effect generation method provided in any embodiment of the present disclosure, and has corresponding functional modules to implement the method and achieve the beneficial effect of the present disclosure.

It should be noted that the units and modules comprised in the above apparatus are only divided according to the functional logic, but are not limited to the above division, as long as the corresponding functions can be realized. In addition, the specific names of the functional units are only for the convenience of distinguishing from each other, and are not used to limit the protection scope of the embodiments of the present disclosure.

Figure 10:
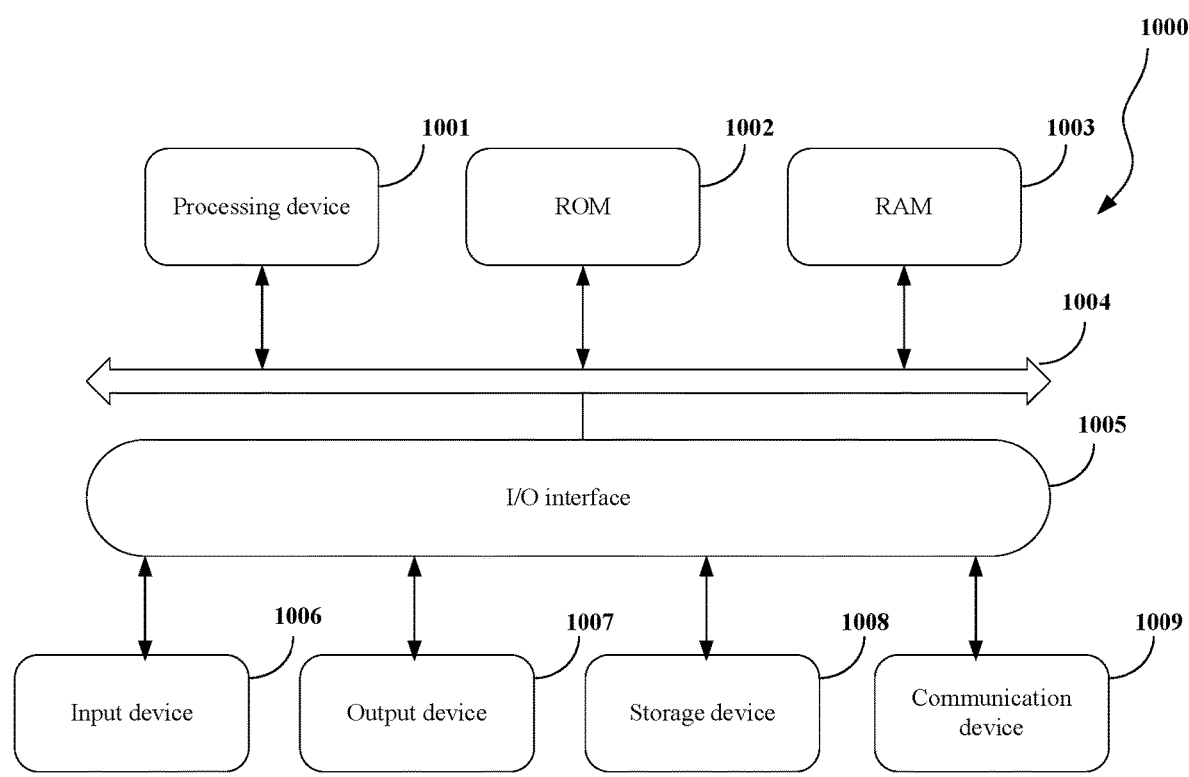
FIG. 10 is a schematic structural diagram of an electronic device provided in an embodiment of the present disclosure.

Referring to FIG. 10, a structural diagram of an electronic device (e.g., a terminal device or server shown in FIG. 10) 1000 suitable for implementing an embodiment of the present disclosure is shown. The terminal device 1000 of the embodiment of the present disclosure may comprise, but not limited to, a mobile terminal such as a mobile phone, a notebook computer, a digital broadcast receiver, a PDA (Personal Digital Assistant), a PAD (tablet computer), a PMP (Portable Multimedia Player), an on-board terminal (such as an on-board navigation terminal), and a fixed terminal such as a digital TV, a desktop computer, and the like. The electronic device 1000 shown in FIG. 10 is merely an example and should not impose any limitation on the function and scope of the embodiment of the present disclosure.

As shown in FIG. 10, the electronic device 1000 may comprise a processing device (e.g., a central processing unit, a graphics processor) 1001, which may perform various appropriate actions and processes according to a program stored in Read Only Memory (ROM) 1002 or a program loaded from storage device 1008 into Random Access Memory (RAM) 1003. In RAM 1003, various programs and data required for the operation of the electronic device 1000 are also stored. The processing device 1001, ROM 1002, and RAM 1003 are connected to each other through a bus 1004. Input/Output (I/O) interface 1005 is also connected to bus 1004.

Generally, the following devices can be connected to the I/O interface 1005: input devices 1006 comprising, for example, a touch screen, a touch pad, a keyboard, a mouse, a camera, a microphone, an accelerometer, a gyroscope, etc; output devices 1007 comprising a liquid crystal display (LCD), a speaker, a vibrator, etc.; a storage device 1008 such as a magnetic tape, a hard disk, etc; and a communication device 1009. The communication device 1009 enables the electronic device 1000 to communicate in a wireless or wired manner with other devices to exchange data. Although FIG. 10 shows the electronic device 1000 with various components, it should be understood that it is not required to implement or have all of these components. Alternatively, more or fewer components can be implemented or provided.

According to an embodiment of the present disclosure, the processes described above with reference to the flowchart can be implemented as a computer software program. For example, an embodiment of the present disclosure comprises a computer program product, which comprises a computer program carried on a non-transitory computer readable medium, and containing program code for executing the method shown in the flowchart. In such an embodiment, the computer program may be downloaded and installed from the network through the communication device 1009, or installed from the storage device 1008, or from the ROM 1002. When the computer program is executed by the processing device 1001, the above functions defined in the method of the embodiment of the present disclosure are performed.

The electronic device provided by this embodiment and the special effect generation method provided by the above embodiment belong to the same inventive concept. For the technical details not described in detail in this embodiment, reference can be made to the above embodiment, and this embodiment can achieve the same beneficial effect as the above embodiment.

Some embodiments of the present application provides a computer storage medium stored thereon a computer program that, when executed by a processor, cause the processor to implement the special effect generation method provided in any of the above embodiments.

The computer readable medium in the present disclosure may be a computer readable signal medium or a computer readable storage medium, or any combination of thereof. The computer readable storage medium can be, for example, but not limited to, an electronic, magnetic, optical, electromagnetic, infrared, or semiconductor system, apparatus, or device, or any combination of the above. More specific examples of the computer readable storage medium may comprise, but are not limited to: electrical connection with one or more wires, portable computer disk, hard disk, random access memory (RAM), read only memory (ROM), erasable programmable read only memory (EPROM) or flash memory (FLASH), fiber optics, portable compact disk Read only memory (CD-ROM), optical storage device, magnetic storage device, or any suitable combination of the foregoing. In the present disclosure, the computer readable storage medium can be any tangible medium that can contain or store a program, which can be used by or in connection with an instruction execution system, apparatus or device. In the present disclosure, a computer readable signal medium may comprise a data signal that is propagated in the baseband or as part of a carrier, carrying computer readable program code. Such propagated data signals can take a variety of forms comprising, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution system, apparatus, or device. Program code embodied on a computer readable medium can be transmitted by any suitable medium, comprising but not limited to wires, optical cables, RF (Radio Frequency), etc., or any suitable combination of the above.

In some embodiments, a client and a server can communicate using any currently known or future developed network protocol such as HTTP (HyperText Transfer Protocol), and can be interconnected by any form or medium of digital data communication, e.g., a communication network. Examples of communication networks comprise a Local Area Network ("LAN"), a Wide Area Network ("WAN"), an Internet (e.g., the Internet), and an end-to-end network (e.g., an ad hoc end-to-end network), as well as any currently known or future developed network.

The above computer readable medium may be comprised in the electronic device described above; or it may exist alone without being assembled into the electronic device.

The computer readable medium carries one or more programs that, when executed by the electronic device, cause the electronic device to perform steps of: segmenting an image to be processed to obtain multiple layers, in response to a special effect instruction; obtaining three-dimensional (3D) pose information of a special effect object, and determining an occlusion relationship between the special effect object and the multiple layers based on the 3D pose information; and rendering the special effect object or the multiple layers according to the occlusion relationship to generate a special effect image.

The computer program code for executing operations of the present disclosure may be complied by any combination of one or more program design languages, the program design languages comprising object-oriented program design languages, such as Java, Smalltalk, C++, etc, as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the latter circumstance, the remote computer may be connected to the user computer through various kinds of networks, comprising local area network (LAN) or wide area network (WAN), or connected to external computer (for example using an internet service provider via Internet).

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. It should also be noted that, in some alternative implementations, the functions noted in the block may occur out of the order noted in the FIG.s. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The units involved in the embodiments described in the present disclosure can be implemented in software or hardware. Wherein, the names of the units or modules do not constitute a limitation on the units or modules themselves under certain circumstances.

The functions described above may be performed at least in part by one or more hardware logic components. For example, without limitation, exemplary types of hardware logic components that can be used comprise: Field Programmable Gate Array (FPGA), Application Specific Integrated Circuit (ASIC), Application Specific Standard Product (ASSP), System on Chip (SOC), Complex Programmable Logic Device (CPLD), and the like.

In the context of the present disclosure, a machine-readable medium may be a tangible medium, which may contain or store a program for use by or in connection with an instruction execution system, apparatus, or device. The machine-readable medium may be a machine-readable signal medium or a machine-readable storage medium. The machine readable medium may comprise, but is not limited to, an electronic, magnetic, optical, electromagnetic, infrared, or semiconductor, apparatus, or device, or any suitable combination of thereof. More specific examples of the machine-readable storage medium may comprise electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing.

According to one or more embodiments of the present disclosure, there is provided a special effect generation method, comprising:
  segmenting an image to be processed to obtain multiple layers, in response to a special effect instruction;
  obtaining three-dimensional (3D) pose information of a special effect object, and determining an occlusion relationship between the special effect object and the multiple layers based on the 3D pose information; and
  rendering the special effect object or the multiple layers according to the occlusion relationship to generate a special effect image.

According to one or more embodiments of the present disclosure, there is provided a special effect generation method, further comprising:
  In some embodiments, the method further comprises: after generating the special effect image and in response to the image to be processed being a real-time captured image:
    in response to a preset trigger, terminating the rendering of the special effect object or the multiple layers according to the occlusion relationship, and displaying the real-time captured image,
    wherein the preset trigger comprises at least one of: a preset input operation, a trigger of a countdown timer, and an identification of a predefined action of the special effect object.

According to one or more embodiments of the present disclosure, there is provided a special effect generation method, further comprising:
  in some embodiments, the determining the occlusion relationship between the special effect object and the multiple layers based on the 3D pose information comprises:
  determining an overlapping relationship of the multiple layers based on depth information of each of the multiple layers; and
  determining the occlusion relationship between the special effect object and the multiple layers according to the 3D pose information of multiple feature points of the special effect object and the overlapping relationship of the multiple layers.

According to one or more embodiments of the present disclosure, there is provided a special effect generation method, further comprising:
  in some embodiments, in response to the special effect object being a virtual object, the rendering the special effect object or the multiple layers comprises:
  identifying a 3D position of a plane layer among the multiple layers;
  fitting a preset surface of the special effect object to the plane layer according to the 3D position of the plane layer and the 3D pose information of the special effect object; and superimposing and rendering a region of the special effect object that is not occluded by the multiple layers on a layer corresponding to the region.

According to one or more embodiments of the present disclosure, there is provided a special effect generation method, further comprising:

in some embodiments, the multiple layers obtained through segmentation comprise a real object layer; the multiple layers obtained through segmentation comprise a real object layer and the method further comprises, before the obtaining the 3D pose information of the special effect object:

determining a real object in the real object layer as the special effect object.

According to one or more embodiments of the present disclosure, there is provided a special effect generation method, further comprising:

in some embodiments, in response to the special effect object being a real object in the image to be processed, the obtaining the 3D pose information of the special effect object comprises:

estimating 3D skeleton information of the special effect object, and determining the 3D pose information of the special effect object according to the estimated 3D skeleton information.

According to one or more embodiments of the present disclosure, there is provided a special effect generation method, further comprising:

in some embodiments, n response to the special effect object being a real object in the image to be processed, the rendering the special effect object or the multiple layers comprises:

inpainting a region meeting a condition in each of the multiple layers, wherein the region meeting the condition comprises a region occluded by the special effect object in the image to be processed, and occluding the special effect object in the occlusion relationship.

According to one or more embodiments of the present disclosure, there is provided a special effect generation method, further comprising:

in some embodiments, in response to the image to be processed being a real-time captured image, the inpainting the region meeting the condition in each of the multiple layers comprises:

in response to the real-time captured image being captured with a fixed camera position, inpainting the region meeting the condition in each of the multiple layers based on pixels in a region corresponding to the region meeting the condition in the each of the multiple layers in a previous frame image; and in response to the real-time captured image being captured with a moving camera position, inpainting the region meeting the condition in each of the multiple layers by a preset image inpainting algorithm.

According to one or more embodiments of the present disclosure, there is provided a special effect generation method, further comprising:

in some embodiments, the rendering the special effect object comprises: rendering the special effect object with a change in size of the special effect object.

According to one or more embodiments of the present disclosure, there is provided a special effect generation method, further comprising:

in some embodiments, the multiple layers comprise a foreground layer, a background layer, and a plane layer, and the occlusion relationship comprises an occlusion relationship between the foreground layer and the special effect object.

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are comprised in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable subcombination.

What is claimed is:

1. A special effect generation method, comprising:
   segmenting an image to be processed to obtain multiple layers, in response to a special effect instruction;
   obtaining three-dimensional (3D) pose information of a special effect object, and determining an occlusion relationship between the special effect object and the multiple layers based on the 3D pose information; and
   rendering the special effect object or the multiple layers according to the occlusion relationship to generate a special effect image, wherein in response to the special effect object being a virtual object, the rendering the special effect object or the multiple layers comprises:
   identifying a 3D position of a plane layer among the multiple layers,
   fitting a preset surface of the special effect object to the plane layer according to the 3D position of the plane layer and the 3D pose information of the special effect object, and
   superimposing and rendering a region of the special effect object that is not occluded by the multiple layers on a layer corresponding to the region.

2. The special effect generation method according to claim 1, further comprising, wherein after generating the special effect image and in response to the image to be processed being a real-time captured image:
   in response to a preset trigger, terminating the rendering of the special effect object or the multiple layers according to the occlusion relationship, and displaying the real-time captured image,
   wherein the preset trigger comprises at least one of: a preset input operation, a trigger of a countdown timer, and an identification of a predefined action of the special effect object.

3. The special effect generation method according to claim 1, wherein the determining the occlusion relationship between the special effect object and the multiple layers based on the 3D pose information comprises:
   determining an overlapping relationship of the multiple layers based on depth information of each of the multiple layers; and
   determining the occlusion relationship between the special effect object and the multiple layers according to the 3D pose information of multiple feature points of the special effect object and the overlapping relationship of the multiple layers.

4. The special effect generation method according to claim 1, wherein the multiple layers obtained through segmentation comprise a real object layer and the method further comprises, before the obtaining the 3D pose information of the special effect object:
  determining a real object in the real object layer as the special effect object.

5. The special effect generation method according to claim 1, wherein in response to the special effect object being a real object in the image to be processed, the obtaining the 3D pose information of the special effect object comprises:
  estimating 3D skeleton information of the special effect object, and determining the 3D pose information of the special effect object according to the estimated 3D skeleton information.

6. The special effect generation method according to claim 1, wherein in response to the special effect object being a real object in the image to be processed, the rendering the special effect object or the multiple layers comprises:
  inpainting a region meeting a condition in each of the multiple layers,
  wherein the region meeting the condition comprises a region occluded by the special effect object in the image to be processed, and occluding the special effect object in the occlusion relationship.

7. The special effect generation method according to claim 6, wherein in response to the image to be processed being a real-time captured image, the inpainting the region meeting the condition in each of the multiple layers comprises:
  in response to the real-time captured image being captured with a fixed camera position, inpainting the region meeting the condition in each of the multiple layers based on pixels in a region corresponding to the region meeting the condition in the each of the multiple layers in a previous frame image; and
  in response to the real-time captured image being captured with a moving camera position, inpainting the region meeting the condition in each of the multiple layers by a preset image inpainting algorithm.

8. The special effect generation method according to claim 1, wherein the rendering the special effect object comprises:
  rendering the special effect object with a change in size of the special effect object.

9. The special effect generation method according to claim 1, wherein the multiple layers comprise a foreground layer, a background layer, and a plane layer, and the occlusion relationship comprises an occlusion relationship between the foreground layer and the special effect object.

10. An electronic device, comprising:
  at least one processor; a storage device for storing at least one program that, when executed by at least one processor, causes the at least one processor to:
  segment an image to be processed to obtain multiple layers, in response to a special effect instruction;
  obtain three-dimensional (3D) pose information of a special effect object, and determine an occlusion relationship between the special effect object and the multiple layers based on the 3D pose information; and
  render the special effect object or the multiple layers according to the occlusion relationship to generate a special effect image, wherein in response to the special effect object being a virtual object, the rendering the special effect object or the multiple layers comprises:
    identifying a 3D position of a plane layer among the multiple layers,
    fitting a preset surface of the special effect object to the plane layer according to the 3D position of the plane layer and the 3D pose information of the special effect object, and
    superimposing and rendering a region of the special effect object that is not occluded by the multiple layers on a layer corresponding to the region.

11. The electronic device according to claim 10, wherein the at least one program when executed by at least one processor, further causes the at least one processor to, after generating the special effect image and in response to the image to be processed being a real-time captured image:
  in response to a preset trigger, terminate the rendering of the special effect object or the multiple layers according to the occlusion relationship, and display the real-time captured image,
  wherein the preset trigger comprises at least one of: a preset input operation, a trigger of a countdown timer, and an identification of a predefined action of the special effect object.

12. The electronic device according to claim 10, wherein the determining the occlusion relationship between the special effect object and the multiple layers based on the 3D pose information comprises:
  determining an overlapping relationship of the multiple layers based on depth information of each of the multiple layers; and
  determining the occlusion relationship between the special effect object and the multiple layers according to the 3D pose information of multiple feature points of the special effect object and the overlapping relationship of the multiple layers.

13. The electronic device according to claim 10, wherein the multiple layers obtained through segmentation comprise a real object layer and the method further comprises, before the obtaining the 3D pose information of the special effect object:
  determining a real object in the real object layer as the special effect object.

14. The electronic device according to claim 13, wherein in response to the special effect object being a real object in the image to be processed, the obtaining the 3D pose information of the special effect object comprises:
  estimating 3D skeleton information of the special effect object, and determining the 3D pose information of the special effect object according to the estimated 3D skeleton information.

15. The electronic device according to claim 10, wherein in response to the special effect object being a real object in the image to be processed, the rendering the special effect object or the multiple layers comprises:
  inpainting a region meeting a condition in each of the multiple layers,
  wherein the region meeting the condition comprises a region occluded by the special effect object in the image to be processed, and occluding the special effect object in the occlusion relationship.

16. The electronic device according to claim 15, wherein in response to the image to be processed being a real-time captured image, the inpainting the region meeting the condition in each of the multiple layers comprises:
  in response to the real-time captured image being captured with a fixed camera position, inpainting the region meeting the condition in each of the multiple layers based on pixels in a region corresponding to the region meeting the condition in the each of the multiple layers in a previous frame image; and in response to the real-time captured image being captured with a moving camera position, inpainting the region meeting the condition in each of the multiple layers by a preset image inpainting algorithm.

17. The electronic device according to claim 10, wherein rendering the special effect object comprises:
rendering the special effect object with a change in size of the special effect object.

18. A non-transitory computer-readable storage medium containing computer executable instructions that, when executed by a processor, cause the processor to implement operations comprising:
segmenting an image to be processed to obtain multiple layers, in response to a special effect instruction;
obtaining three-dimensional (3D) pose information of a special effect object, and determine an occlusion relationship between the special effect object and the multiple layers based on the 3D pose information; and
rendering the special effect object or the multiple layers according to the occlusion relationship to generate a special effect image, wherein in response to the special effect object being a virtual object, the rendering the special effect object or the multiple layers comprises:
identifying a 3D position of a plane layer among the multiple layers,
fitting a preset surface of the special effect object to the plane layer according to the 3D position of the plane layer and the 3D pose information of the special effect object, and
superimposing and rendering a region of the special effect object that is not occluded by the multiple layers on a layer corresponding to the region.

19. The non-transitory computer-readable storage medium according to claim 18, wherein after generating the special effect image and in response to the image to be processed being a real-time captured image, the operations further comprise:
in response to a preset trigger, terminating the rendering of the special effect object or the multiple layers according to the occlusion relationship, and displaying the real-time captured image, wherein the preset trigger comprises at least one of: a preset input operation, a trigger of a countdown timer, or an identification of a predefined action of the special effect object.

20. The non-transitory computer-readable storage medium according to claim 18, wherein the determining the occlusion relationship between the special effect object and the multiple layers based on the 3D pose information comprises:
determining an overlapping relationship of the multiple layers based on depth information of each of the multiple layers; and
determining the occlusion relationship between the special effect object and the multiple layers according to the 3D pose information of multiple feature points of the special effect object and the overlapping relationship of the multiple layers.

* * * * *